## (12) United States Patent
Goto

(10) Patent No.: US 11,050,073 B2
(45) Date of Patent: Jun. 29, 2021

(54) POWER GENERATION UNIT AND CONTROL METHOD OF THE SAME

(71) Applicant: KYOCERA Corporation, Kyoto (JP)

(72) Inventor: Ryo Goto, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 288 days.

(21) Appl. No.: 16/320,575

(22) PCT Filed: Jul. 25, 2017

(86) PCT No.: PCT/JP2017/026928
§ 371 (c)(1),
(2) Date: Jan. 25, 2019

(87) PCT Pub. No.: WO2018/021349
PCT Pub. Date: Feb. 1, 2018

(65) Prior Publication Data
US 2019/0273274 A1 Sep. 5, 2019

(30) Foreign Application Priority Data
Jul. 27, 2016 (JP) .............................. JP2016-147645

(51) Int. Cl.
| H01M 8/04 | (2016.01) |
| H01M 8/04858 | (2016.01) |
| H01M 8/04082 | (2016.01) |
| H01M 8/04537 | (2016.01) |
| H01M 8/04746 | (2016.01) |
| H02M 7/48 | (2007.01) |
| H01M 8/12 | (2016.01) |

(52) U.S. Cl.
CPC ... *H01M 8/04925* (2013.01); *H01M 8/04201* (2013.01); *H01M 8/04604* (2013.01); *H01M 8/04753* (2013.01); *H01M 8/04858* (2013.01); *H01M 8/04895* (2013.01); *H02M 7/48* (2013.01); *H01M 8/12* (2013.01)

(58) Field of Classification Search
None
See application file for complete search history.

(56) References Cited

U.S. PATENT DOCUMENTS

2014/0236370 A1* 8/2014 Nakayama ................ H02J 4/00
700/291

FOREIGN PATENT DOCUMENTS

| EP | 2546911 A1 | 1/2013 |
| EP | 2763268 A1 | 8/2014 |
| EP | 2869378 A1 | 5/2015 |
| JP | 2015-156769 A | 8/2015 |

* cited by examiner

Primary Examiner — Wyatt P McConnell
(74) Attorney, Agent, or Firm — Hauptman Ham, LLP

(57) ABSTRACT

Power is generated efficiently using fuel. A power generation unit includes a power generation module that generates power using fuel, a supply unit that supplies fuel to the power generation module, a power converter that converts DC power supplied by the power generation module into AC power, and a controller that controls the supply unit and the power converter. The controller controls the supply unit or the power converter so that the output power supplied to a load with fluctuating power consumption becomes greater than the power consumption of the load by a predetermined margin.

12 Claims, 3 Drawing Sheets

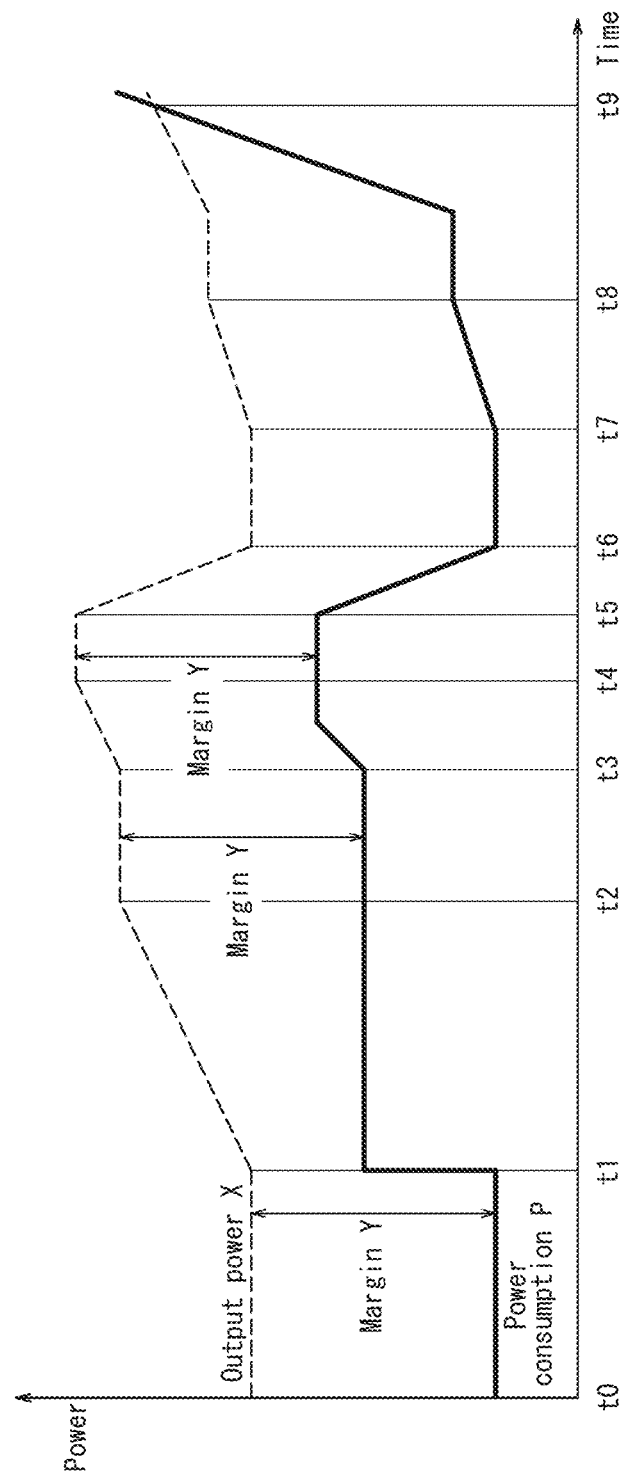

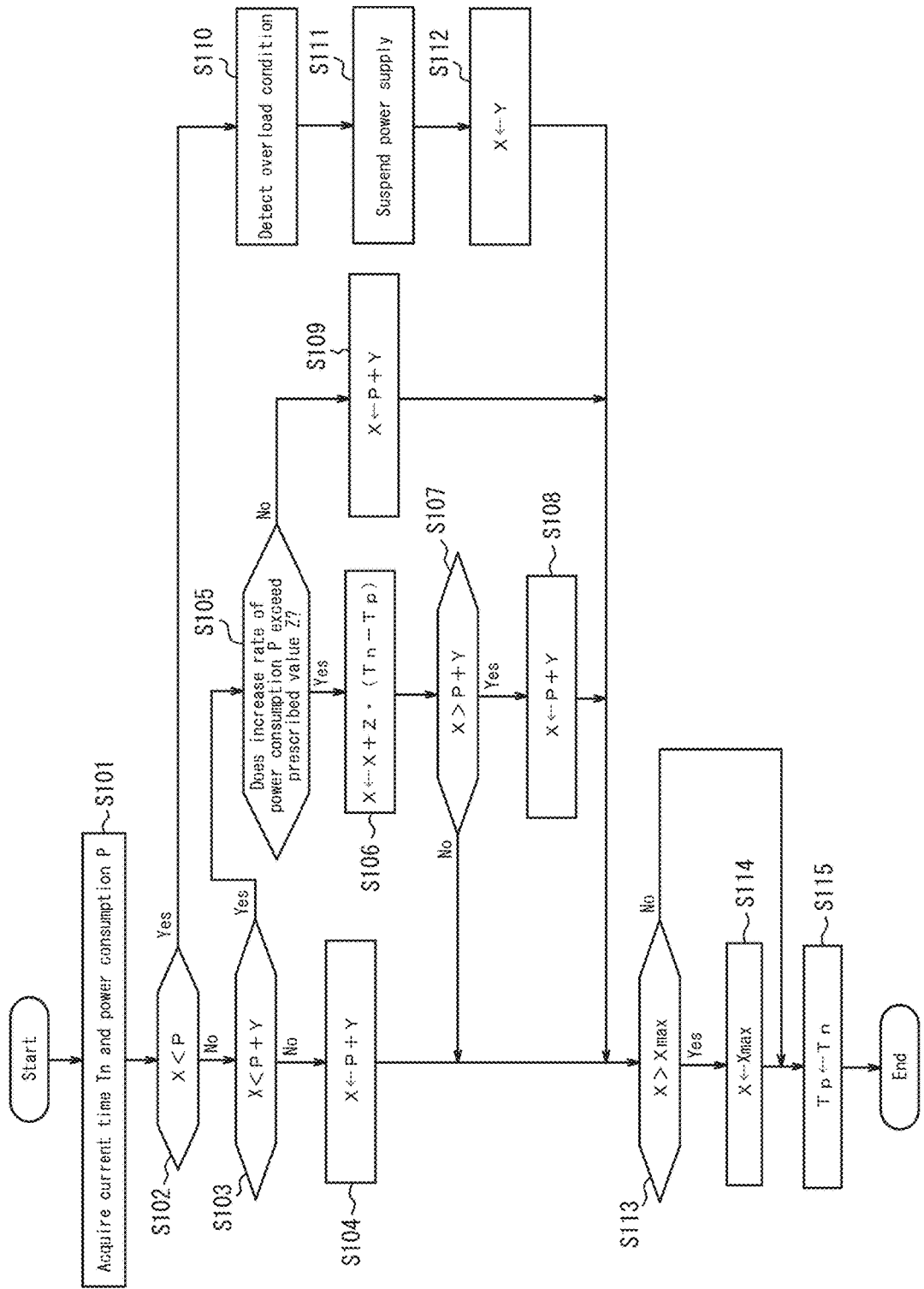

POWER GENERATION UNIT AND CONTROL METHOD OF THE SAME

CROSS-REFERENCE TO RELATED APPLICATION

The present application is a national phase of International Application Number PCT/JP2017/026928, filed Jul. 25, 2017, which claims priority to and the benefit of Japanese Patent Application No. 2016-147645 filed Jul. 27, 2016, the entire contents of which are incorporated herein by reference.

TECHNICAL FIELD

The present disclosure relates to a power generation unit and a control method of the same.

BACKGROUND

In recent years, power generation apparatuses are increasingly being installed in consumer facilities. It is difficult, however, for power generation apparatuses that generate power using fuel to suddenly increase their output power when the power consumption of the load suddenly increases. To allow continuous supply of electric power when the power consumption of the load suddenly increases, a system that controls the output power of a power generation apparatus to be constant, regardless of fluctuation in the power consumption of the load, has therefore been known. The system performs control for the output power of a power generation module to be constant at the expected maximum power consumption of the load, thereby allowing continuous supply of electric power even when the power consumption of the load suddenly increases.

SUMMARY

A power generation unit according to an embodiment of the present disclosure includes a power generation module, a supply unit, a power converter, and a controller. The power generation module generates electric power using fuel. The supply unit supplies fuel to the power generation module. The power converter converts DC power supplied by the power generation module into AC power. The controller controls the supply unit and the power converter. The controller controls the supply unit or the power converter so that an output power supplied to a load with fluctuating power consumption becomes greater than the power consumption of the load by a predetermined margin.

A control method of a power generation unit according to an embodiment of the present disclosure is for a power generation unit that includes a power generation module, a supply unit, and a power converter. The power generation module generates electric power using fuel. The supply unit supplies fuel to the power generation module. The power converter converts DC power supplied by the power generation module into AC power. The control method of a power generation unit includes controlling the supply unit or the power converter so that an output power supplied to a load with fluctuating power consumption becomes greater than the power consumption of the load by a predetermined margin.

BRIEF DESCRIPTION OF THE DRAWINGS

In the accompanying drawings:

FIG. 2 illustrates an example waveform of the output power of a fuel cell unit according to an embodiment of the present disclosure; and FIG. 3 is a flowchart illustrating an example of operations by a fuel cell unit according to an embodiment of the present disclosure during independent operation.

DETAILED DESCRIPTION

Figure 1:
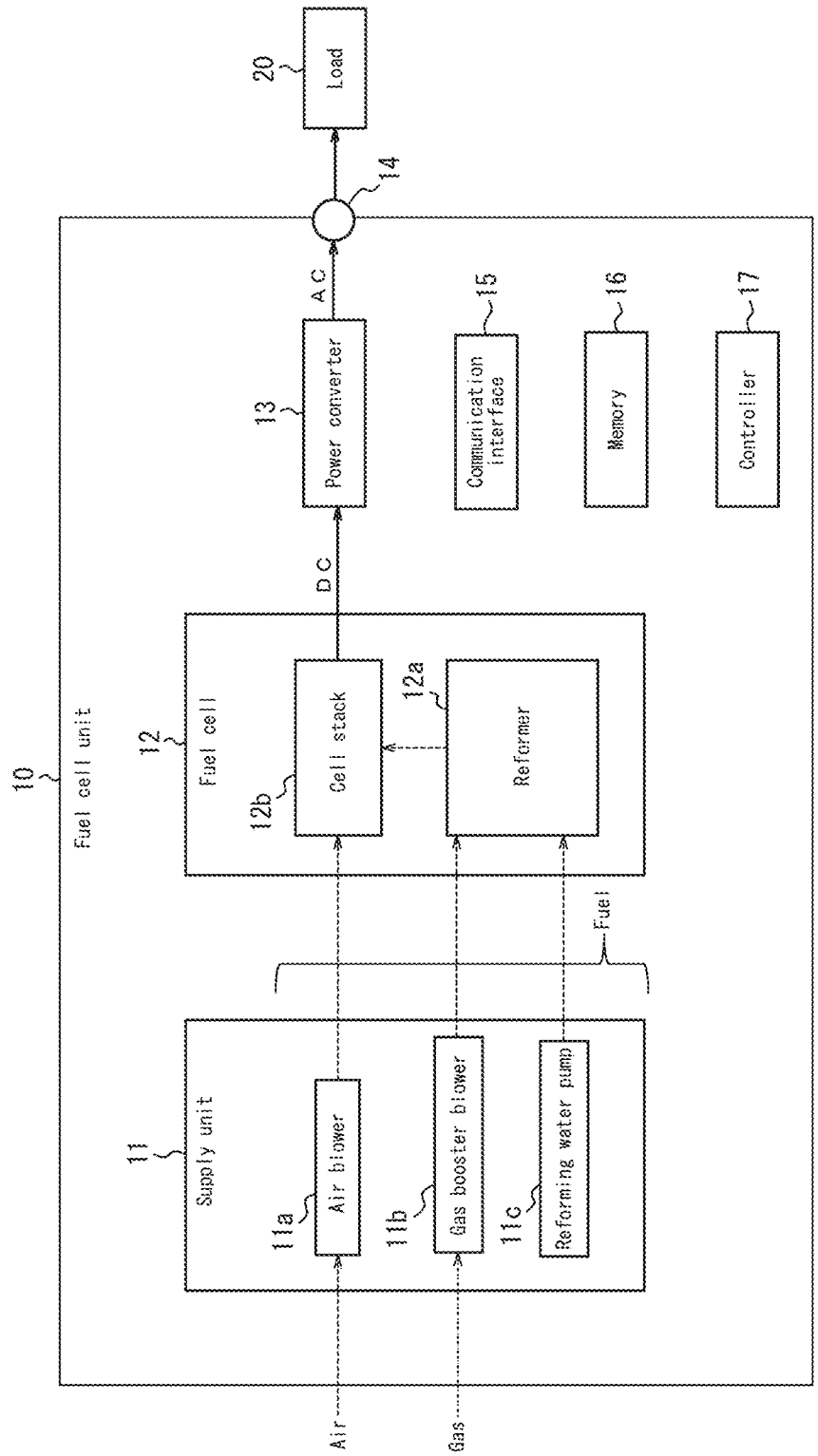
FIG. 1 illustrates the schematic configuration of a fuel cell unit according to an embodiment of the present disclosure.

A system performs control for the output power of a power generation module to be constant at the expected maximum power consumption of the load. The system performs this control by supplying the power generation module with the amount of fuel necessary for generating electric power corresponding to the expected maximum power consumption of the load. Therefore, when the power consumption of the load decreases in the system, the surplus power not consumed by the load increases, causing the proportion of fuel spent for surplus power to increase. Furthermore, the surplus power is consumed in the system by an internal load, such as an electric heater, included in the system. The system thus supplies excess fuel to the power generation module when the power consumption of the load is small. Additionally, the system causes the internal load to consume a somewhat large surplus power when the power consumption is small. This may cause the temperature in the system to rise.

The system thus has room for improvement in terms of efficiently generating power using fuel.

In light of these considerations, the present disclosure aims to provide a power generation unit that can efficiently generate power using fuel and a control method of the same.

Embodiments of the present disclosure are now described with reference to the drawings. The power generation module is described below as being a solid oxide fuel cell, but this example is not limiting. The power generation module may be any other type of fuel cell that generates power using fuel. For example, the power generation module may be a solid polymer electrolyte fuel cell or the like.

[System Configuration]

The fuel cell unit (power generation unit) 10 in FIG. 1 is a power generation unit capable of independent operation and is installed in a consumer facility. The fuel cell unit 10 may be a power generation unit capable of switching between interconnected operation and independent operation. The functions related to independent operation of the fuel cell unit 10 are mainly described below, but the fuel cell unit 10 may also have functions related to interconnected operation. In FIG. 1, dashed lines indicate the flow of fluids, such as gas, and solid lines indicate the direction of electric power.

As illustrated in FIG. 1, the fuel cell unit 10 includes a supply unit 11, a fuel cell (power generation module) 12, a power converter 13, a terminal 14, a communication interface 15, a memory 16, and a controller 17.

The supply unit 11 supplies gas, air, and reforming water (collectively referred to as "fuel") to the fuel cell 12. In FIG. 1, the supply unit 11 includes an air blower 11a, a gas booster blower 11b, and a reforming water pump 11c. Furthermore, the supply unit 11 may include a heat exchanger, a heater, and the like.

The air blower 11a pressurizes air supplied from the outside and sends the air to the fuel cell 12. The gas booster blower 11b pressurizes gas supplied from the outside (such as city gas or propane gas) and sends the gas to the fuel cell 12. The reforming water pump 11c supplies reforming water generated by a heat exchange process in a heat exchanger or the like to the fuel cell 12.

The fuel cell 12 generates electric power using fuel. The fuel cell 12 includes a reformer 12a and a cell stack 12b.

The reformer 12a generates reformed gas (hydrogen) using gas and reforming water supplied by the supply unit 11. The reformer 12a supplies the generated reformed gas to the cell stack 12b. The cell stack 12b generates direct current (DC) power by electrochemically reacting oxygen included in the air supplied by the supply unit 11 with the reformed gas supplied by the reformer 12a. The cell stack 12b supplies the generated DC power to the power converter 13.

When the reformed gas (hydrogen) is supplied directly to the supply unit 11 from the outside, the gas booster blower 11b may supply the reformed gas directly to the cell stack 12b.

The power converter 13 converts the DC power supplied by the fuel cell 12 into alternating current (AC) power. The power converter 13 supplies the converted AC power to a load 20 connected to the terminal 14, which is an electric outlet for independent operation.

The terminal 14 is an electric outlet, for independent operation, to which the load 20 is connected. During a power outage of the commercial power grid, for example, a user connects the load 20 to the terminal 14 to receive power supply from the fuel cell unit 10 that is performing independent operation. The load 20 is any number of electrical devices or the like that consume electric power supplied by the fuel cell unit 10. The power consumption of the load 20 fluctuates.

The communication interface 15 communicates with an apparatus or the like external to the fuel cell unit 10.

The memory 16 stores information necessary for processing of the fuel cell unit 10 and programs with a description of processing to implement the functions of the fuel cell unit 10. For example, the memory 16 stores the time and the power consumption of the load 20 in association. Furthermore, the memory 16 stores the below-described predetermined margin Y.

The controller 17 is a processor or the like, for example, that controls and manages the fuel cell unit 10 overall. The controller 17 is formed by any appropriate processor, such as a general-purpose central processing unit (CPU) that reads software for executing the processing of various functions. The controller 17 may also be formed by a dedicated processor, for example, dedicated to processing for various functions.

The controller 17 controls the supply unit 11 to adjust the flow rate of fuel sent from the supply unit 11 to the fuel cell 12. The controller 17 also controls the power converter 13 to adjust the output power supplied from the fuel cell unit 10 to the load 20.

The controller 17 acquires a current time Tn and also acquires a power consumption P that is the electric power being consumed by the load 20 at the current time Tn. The controller 17 may, for example, acquire the current time Tn from a timer located within the fuel cell unit 10 or through the communication interface 15 from an external server or the like. The controller 17 may, for example, acquire the power consumption P by calculating the power consumption P using a value acquired from a current sensor included in the power converter 13. The controller 17 may, for example, acquire the power consumption P as a predicted value. In this case, the controller 17 stores the time and the power consumption of the load 20 in association in the memory 16 in advance. The controller 17 then acquires the power consumption P as a predicted value by acquiring the power consumption of the load 20 corresponding to the current time Tn from the memory 16 that stores the time and the power consumption of the load 20 in association.

The controller 17 controls the supply unit 11 or the power converter 13 so that an output power X supplied from the fuel cell unit 10 to the load 20 becomes greater than the power consumption P of the load 20 by a predetermined margin Y (i.e. so that $X=P+Y$). The predetermined margin Y can be determined on the basis of the rated output power of the fuel cell unit 10 and the type of load 20 that the user is expected to connect to the terminal 14 at the time of independent operation. The predetermined margin Y can, for example, be set to 500 W when the rated output power of the fuel cell unit 10 is 3 kW and a television with a relatively small power consumption is expected to be connected to the terminal 14 as the load 20 during independent operation. The predetermined margin Y can, for example, be set from 1500 W to 2000 W when the rated output power of the fuel cell unit 10 is 3 kW and a dryer with a relatively large power consumption is expected to be connected to the terminal 14 as the load 20 during independent operation.

As described above, it is difficult for a power generation module that generates power using fuel to rapidly increase its output power when the power consumption of the load rapidly increases. To address this issue, a known system performs control for the output power of a power generation module to be constant at the expected maximum power consumption of the load, thereby allowing continuous supply of electric power even when the power consumption of the load suddenly increases. When the power consumption of the load decreases in such a system, however, the surplus power not consumed by the load increases, causing the proportion of fuel spent for surplus power also to increase. In other words, such a system supplies excess fuel to the power generation module when the power consumption of the load is small.

By contrast, the fuel cell unit 10 according to the present embodiment performs control so that the output power X is greater than the power consumption P by the predetermined margin Y, thereby operating without supplying excess fuel to the fuel cell 12. The fuel cell unit 10 according to the present embodiment can therefore efficiently generate power using fuel. An example of this processing is described below with reference to FIG. 2.

In FIG. 2, the vertical axis represents power, and the horizontal axis represents time. At time t0, the output power X is greater than the power consumption P by the predetermined margin Y as a result of control by the controller 17.

At time t1 in FIG. 2, the power consumption P increases. Consequently, at time t1, the output power X supplied from the fuel cell unit 10 to the load 20 becomes less than the value yielded by adding the predetermined margin Y to the power consumption P of the load 20 (P+Y). Furthermore, the increase rate of the power consumption P at time t1 exceeds the prescribed value Z, which is described below. At this time, the controller 17 controls the supply unit 11 or the power converter 13 so that the output power X increases by the constant prescribed value Z until reaching the value yielded by adding the predetermined margin Y to the power consumption P (i.e. until $X=P+Y$). In FIG. 2, the controller 17 performs control for the output power X to increase by the constant prescribed value Z from time t1 to time t2.

The prescribed value Z is now described. The prescribed value Z is set as the increase rate of output power attainable by the fuel cell unit 10 per unit time. In the fuel cell unit 10, fuel in fluid form is supplied to the fuel cell 12 from the supply unit 11, which is formed by a pump and the like. Power is then generated in the fuel cell 12. Hence, there is a limit on the flow rate of fuel that can be supplied from the supply unit 11 to the fuel cell 12. If the output power of the fuel cell unit 10 is increased without regard for this limit, the fuel supply from the supply unit 11 to the fuel cell 12 may fall behind, leading to a state of insufficient fuel in the fuel cell 12. If this state of insufficient fuel continues, fuel may become insufficient at certain locations in the cell stack 12b, which may cause the cell stack 12b to deteriorate. Rapidly increasing the temperature of the cell stack 12b to rapidly increase the output power of the fuel cell unit 10 may also cause the cell stack 12b to crack. To avoid this situation, the prescribed value Z is set in the present embodiment as the increase rate of output power attainable by the fuel cell unit 10 per unit time, considering factors such as the limit on the flow rate of fuel that can be supplied from the supply unit 11 to the fuel cell 12.

The prescribed value Z is set in this way in the fuel cell unit 10 according to the present embodiment. Furthermore, the fuel cell unit 10 increases the output power X by the constant prescribed value Z when the output power X becomes less than the value yielded by adding the predetermined margin Y to the power consumption P (P+Y) and the increase rate of the power consumption P exceeds the prescribed value Z. Consequently, the fuel cell unit 10 according to the present embodiment can avoid a situation such as the fuel supply not being able to keep up with the fuel cell 12 and can therefore prevent deterioration of the fuel cell 12.

The fuel cell unit 10 according to the present embodiment sets the output power X to be greater than the power consumption P by the predetermined margin Y in advance. This control allows the fuel cell unit 10 to prevent the power consumption P from exceeding the output power X when the power consumption P rapidly increases, as long as the amount of increase is at most the predetermined margin Y. The fuel cell unit 10 according to the present embodiment can therefore continue to supply power to the load 20.

At time t3 in FIG. 2, the power consumption P increases. Consequently, at time t3, the output power X supplied from the fuel cell unit 10 to the load 20 becomes less than the value yielded by adding the predetermined margin Y to the power consumption P of the load 20 (P+Y). Furthermore, the increase rate of the power consumption P at time t3 exceeds the prescribed value Z. The controller 17 therefore performs the same control as described above for time t1. In FIG. 2, the controller 17 performs control for the output power X to increase by the constant prescribed value Z from time t3 to time t4.

At time t5 in FIG. 2, the power consumption decreases. Consequently, at time t5, the output power X supplied from the fuel cell unit 10 to the load 20 becomes greater than the value yielded by adding the predetermined margin Y to the power consumption P of the load 20 (P+Y). At this time, the controller 17 controls the supply unit 11 or the power converter 13 so that the output power X decreases until reaching the value yielded by adding the predetermined margin Y to the power consumption P (i.e. until X=P+Y).

The controller 17 may decrease the output power X at any rate of decrease (for example, the same rate of decrease as the power consumption P). In FIG. 2, the controller 17 performs control for the output power X to decrease at the same rate of decrease as the power consumption P from time t5 to time t6.

When the output power X becomes greater than the value yielded by adding the predetermined margin Y to the power consumption P (P+Y), the fuel cell unit 10 according to the present embodiment thus decreases the output power X until the output power X reaches the value yielded by adding the predetermined margin Y to the power consumption P (P+Y). As a result, the fuel cell unit 10 according to the present embodiment operates without supplying the fuel cell 12 with excess fuel and can therefore efficiently generate power.

At time t7 in FIG. 2, the power consumption P increases. Consequently, the output power X supplied from the fuel cell unit 10 to the load 20 becomes less than the value yielded by adding the predetermined margin Y to the power consumption P of the load 20 (P+Y) at time t7. Furthermore, the increase rate of the power consumption P at time t7 is below the prescribed value Z. At this time, the controller 17 controls the supply unit 11 or the power converter 13 so that the output power X increases at an increase rate below the prescribed value Z until reaching the value yielded by adding the predetermined margin Y to the power consumption P (i.e. until X=P+Y). During this control, the controller 17 may perform control for the output power X to increase at the same increase rate as the power consumption P. In FIG. 2, the controller 17 performs control for the output power X to increase at the same increase rate as the power consumption P from time t7 to time t8.

The prescribed value Z is set in this way in the fuel cell unit 10 according to the present embodiment. Furthermore, the fuel cell unit 10 increases the output power X at an increase rate below the prescribed value Z when the output power X becomes less than the value yielded by adding the predetermined margin Y to the power consumption P (P+Y) and the increase rate of the power consumption P is below the prescribed value Z. Consequently, the fuel cell unit 10 according to the present embodiment can avoid a situation such as the fuel supply not being able to keep up with the fuel cell 12 and can therefore prevent deterioration of the fuel cell 12. A supply of excess fuel to the fuel cell 12 at this time also becomes unnecessary if the fuel cell unit 10 according to the present embodiment performs control for the output power X to increase at the same increase rate as the power consumption P. The fuel cell unit 10 can therefore efficiently generate power.

At time t9 in FIG. 2, the output power X supplied from the fuel cell unit 10 to the load 20 becomes less than the power consumption P of the load 20. At this time, the controller 17 detects the overload condition of the fuel cell unit 10 and temporarily suspends the power supply from the fuel cell unit 10 to the load 20. For example, the controller 17 disconnects a relay for independent operation included in the power converter 13 to suspend the power supply from the fuel cell unit 10 to the load 20. Subsequently, the user performs actions such as reducing the number of loads 20, which are electronic devices or the like connected to the terminal 14, or turning off the power to some of the electronic devices included in the loads 20, to release the fuel cell unit 10 from the overload condition. The controller 17 then performs control for the output power X to become the predetermined margin Y and restarts the power supply from the fuel cell unit 10 to the load 20.

Additionally, if the set output power X becomes greater than the rated output power Xmax of the fuel cell unit 10 when the controller 17 is to change the output power X by the above-described control, then the controller 17 performs control for the output power X to become the rated output power Xmax.

[System Operations]

An example of the operations by the fuel cell unit 10 according to an embodiment of the present disclosure during independent operation is described with reference to FIG. 3. During independent operation, the fuel cell unit 10 repeats the processing in steps S101 to S115 in FIG. 3.

First, the controller 17 acquires the current time Tn. The controller 17 also acquires the power consumption P that is the electric power being consumed by the load 20 at the current time Tn (step S101).

Next, the controller 17 judges whether the output power X supplied from the fuel cell unit 10 to the load 20 is less than the power consumption P (step S102). When it is judged that the output power X is less than the power consumption P (step S102: Yes), the controller 17 proceeds to step S110. Conversely, when it is judged that the output power X is not less than the power consumption P (step S102: No), the controller 17 proceeds to step S103.

In step S103, the controller 17 judges whether the output power X supplied from the fuel cell unit 10 to the load 20 is less than the value yielded by adding the predetermined margin Y to the power consumption P of the load 20 (P+Y). When it is judged that the output power X is less than the value (P+Y) yielded by adding the predetermined margin Y to the power consumption P (step S103: Yes), the controller 17 proceeds to step S105. Conversely, when it is judged that the output power X is not less than the value (P+Y) yielded by adding the predetermined margin Y to the power consumption P (step S103: No), the controller 17 proceeds to step S104.

In step S104, the controller 17 controls the supply unit 11 or the power converter 13 so that the output power X decreases until reaching the value yielded by adding the predetermined margin Y to the power consumption P (i.e. until X=P+Y).

When the output power X becomes greater than the value yielded by adding the predetermined margin Y to the power consumption P (P+Y), the processing in steps S101 to S104 thus allows the output power X to be decreased until the output power X reaches the value yielded by adding the predetermined margin Y to the power consumption P. As a result, the fuel cell unit 10 according to the present embodiment operates without supplying the fuel cell 12 with excess fuel and can therefore efficiently generate power.

In step S105, the controller 17 judges whether the increase rate of the power consumption P of the load 20 exceeds the prescribed value Z. When it is judged that the increase rate of the power consumption P exceeds the prescribed value Z (step S105: Yes), the controller 17 proceeds to step S106. Conversely, when it is judged that the increase rate of the power consumption P does not exceed the prescribed value Z (step S105: No), the controller 17 proceeds to step S109.

In step S106, the controller 17 controls the supply unit 11 or the power converter 13 so that the output power X becomes the value yielded by adding the product of the prescribed value Z and the difference (Tn−Tp) between the current time Tn and a previous time Tp to the output power X (X+Z×(Tn−Tp)). When the previous time Tp has not been set by the below-described processing of step S115 because the processing in step S106 is being performed for the first time, the controller 17 may use any substitute value in place of the difference (Tn−Tp) between the current time Tn and the previous time Tp.

The processing in steps S103, S105, S106 thus allows the output power X to be increased by the constant prescribed value Z when the output power X becomes less than the value yielded by adding the predetermined margin Y to the power consumption P (P+Y) and the increase rate of the power consumption P exceeds the prescribed value Z. Consequently, the fuel cell unit 10 according to the present embodiment can avoid a situation such as the fuel supply not being able to keep up with the fuel cell 12 and can therefore prevent deterioration of the fuel cell 12.

In step S107, the controller 17 judges whether the output power X supplied from the fuel cell unit 10 to the load 20 is greater than the value yielded by adding the predetermined margin Y to the power consumption P of the load 20 (P+Y). When it is judged that the output power X is greater than the value (P+Y) yielded by adding the predetermined margin Y to the power consumption P (step S107: Yes), the controller 17 proceeds to step S108. Conversely, when it is judged that the output power X is not greater than the value (P+Y) yielded by adding the predetermined margin Y to the power consumption P (step S107: No), the controller 17 proceeds to step S113.

In step S108, the controller 17 performs the same processing as in the above-described step S104.

The processing in steps S107, S108 thus controls the output power X, which increased because of the processing in step S106, to be the value yielded by adding the predetermined margin Y to the power consumption P (P+Y).

In step S109, the controller 17 controls the supply unit 11 or the power converter 13 so that the output power X increases at an increase rate below the prescribed value Z until reaching the value yielded by adding the predetermined margin Y to the power consumption P (i.e. until X=P+Y). At this time, the controller 17 may perform control for the output power X to increase at the same increase rate as the power consumption P, for example.

The processing in steps S103, S105, S109 thus allows the output power X to be increased at an increase rate below the prescribed value Z when the output power X becomes less than the value yielded by adding the predetermined margin Y to the power consumption P (P+Y) and the increase rate of the power consumption P is below the prescribed value Z. Consequently, the present embodiment can avoid a situation such as the fuel supply not being able to keep up with the fuel cell 12 and can therefore prevent deterioration of the fuel cell 12. A supply of excess fuel to the fuel cell 12 at this time also becomes unnecessary if the fuel cell unit 10 performs control for the output power X to increase at the same increase rate as the power consumption P. The fuel cell unit 10 can therefore efficiently generate power.

In step S110, the controller 17 detects the overload condition of the fuel cell unit 10. The controller 17 also temporarily suspends the power supply from the fuel cell unit 10 to the load 20 (step S111). For example, the controller 17 disconnects the relay for independent operation included in the power converter 13 to suspend the power supply from the fuel cell unit 10 to the load 20. Subsequently, the user performs actions such as reducing the number of loads 20, which are electronic devices or the like connected to the terminal 14, or turning off the power to some of the electronic devices included in the loads 20, to release the fuel cell unit 10 from the overload condition. The controller 17 then performs control for the output power X to become the predetermined margin Y and restarts the power supply from the fuel cell unit 10 to the load 20 (step S112).

In step S113, the controller 17 judges whether the output power X set in steps S104, S108, S109, S112 is greater than the rated output power Xmax of the fuel cell unit 10. When it is judged that the set output power X is greater than the rated output power Xmax (step S113: Yes), the controller 17 proceeds to step S114. Conversely, when it is judged that the set output power X is not greater than the rated output power Xmax (step S113: No), the controller 17 proceeds to step S115.

In step S114, the controller 17 performs control for the output power X to become the rated output power Xmax, since the output power X set in steps S104, S108, S109, S112 is greater than the rated output power Xmax. In step S115, the controller 17 sets the previous time Tp to the current time Tn. The controller 17 then repeats the processing from step S101.

Control by one fuel cell unit 10 has been described above, but the control of the present embodiment can be executed by a plurality of fuel cell units. In this case, it suffices to control the supply unit or power converter of each fuel cell unit so that the sum of the output powers X of the plurality of fuel cell units is greater than the power consumption P of the load 20 by a predetermined margin.

An example of the controller 17 controlling the output power X of the fuel cell unit 10 on the basis of the power consumption P of the load 20 has been described, but the output current of the fuel cell unit 10 may be controlled on the basis of the current consumption of the load 20.

As described above, the fuel cell unit 10 according to the present embodiment controls the supply unit 11 or the power converter 13 so that the output power X supplied from the fuel cell unit 10 to the load 20 becomes greater than the power consumption P of the load 20 by a predetermined margin. As a result, the fuel cell unit 10 according to the present embodiment operates without supplying the fuel cell 12 with excess fuel and can therefore efficiently generate power.

The output power of the fuel cell unit 10 according to the present embodiment is controlled by the controller 17 or the like, without installation of an apparatus such as an auxiliary power source. The fuel cell unit 10 according to the present embodiment can therefore reduce the costs such as those arising from installation of an auxiliary power source or the like.

The control of the present disclosure is described as a series of operations executed by a computer system and other hardware that can execute program instructions. Examples of the computer system and other hardware include a general-purpose computer, a personal computer (PC), a dedicated computer, a workstation, and other programmable data processing apparatuses. It should be noted that in each embodiment, various operations may be executed by a dedicated circuit (for example, individual logical gates interconnected in order to execute a particular function) implemented by program instructions (software). It should also be noted that various operations may be executed by a logical block, program module, or the like executed by one or more processors. The one or more processors that execute a logical block, program module, or the like encompass, for example, one or more of a microprocessor, a central processing unit (CPU), and a digital signal processor (DSP). The one or more processors encompass, for example, an application specific integrated circuit (ASIC). The one or more processors also, for example, encompass a programmable logic device (PLD) and a field programmable gate array (FPGA). The one or more processors also, for example, encompass a controller, a microcontroller, an electronic device, another apparatus designed to be capable of executing the functions disclosed herein, and/or a combination of any of the above. The embodiments disclosed herein are, for example, implemented by hardware, software, firmware, middleware, microcode, or a combination of any of these.

The network used here may, unless indicated otherwise, be the Internet, an ad hoc network, a local area network (LAN), a cellular network, another network, or a combination of any of these.

The invention claimed is:

1. A power generation unit comprising:
    a power generation module configured to generate electric power using fuel;
    a supply unit configured to supply fuel to the power generation module;
    a power converter configured to convert DC power supplied by the power generation module into AC power; and
    a controller configured to control the supply unit or the power converter so that an output power supplied to a load with fluctuating power consumption becomes greater than the power consumption of the load by a predetermined margin,
    wherein the controller is configured to,
        in response to (i) the output power supplied from the power generation unit to the load being less than a value yielded by addition of the predetermined margin to the power consumption, and (ii) an increase rate of the power consumption exceeding a constant prescribed value,
            control the supply unit or the power converter to increase the output power by the constant prescribed value until the output power reaches the value yielded by addition of the predetermined margin to the power consumption.

2. The power generation unit of claim 1, wherein the controller is configured to
    in response to (i) the output power supplied from the power generation unit to the load being less than the value yielded by addition of the predetermined margin to the power consumption, and (ii) the increase rate of the power consumption being below the constant prescribed value,
        control the supply unit or the power converter to increase the output power at an increase rate below the constant prescribed value until the output power reaches the value yielded by addition of the predetermined margin to the power consumption.

3. The power generation unit of claim 2, wherein the controller is configured to control the supply unit or the power converter to increase the output power at the same increase rate as the power consumption until the output power reaches the value yielded by addition of the predetermined margin to the power consumption.

4. The power generation unit of claim 1, wherein the controller is configured to,
    in response to the output power supplied from the power generation unit to the load being greater than the value yielded by addition of the predetermined margin to the power consumption,
        control the supply unit or the power converter to decrease the output power until reaching the value yielded by addition of the predetermined margin to the power consumption.

5. The power generation unit of claim 1, wherein the controller is further configured to
    detect an overload condition in response to the output power being less than the power consumption of the load, and
    suspend power supply from the power generation unit to the load in response to detecting the overload condition.

6. A control method of a power generation unit, the power generation unit comprising a power generation module configured to generate electric power using fuel, a supply unit configured to supply fuel to the power generation module, and a power converter configured to convert DC power supplied by the power generation module into AC power, the control method comprising:

controlling the supply unit or the power converter so that an output power supplied from the power generation unit to a load with fluctuating power consumption becomes greater than the power consumption of the load by a predetermined margin, wherein in response to (i) the output power supplied from the power generation unit to the load being less than a value yielded by addition of the predetermined margin to the power consumption and (ii) an increase rate of the power consumption exceeding a constant prescribed value, the supply unit or the power converter is controlled to increase the output power by the constant prescribed value until the output power reaches the value yielded by addition of the predetermined margin to the power consumption.

7. The control method of a power generation unit of claim 6, wherein in response to (i) the output power supplied from the power generation unit to the load being less than the value yielded by addition of the predetermined margin to the power consumption and (ii) the increase rate of the power consumption being below the constant prescribed value, the supply unit or the power converter is controlled to increase the output power at an increase rate below the constant prescribed value until the output power reaches the value yielded by addition of the predetermined margin to the power consumption.

8. The control method of a power generation unit of claim 7, wherein the supply unit or the power converter is controlled to increase the output power at the same increase rate as the power consumption until the output power reaches the value yielded by addition of the predetermined margin to the power consumption.

9. The control method of a power generation unit of claim 6, wherein in response to the output power supplied from the power generation unit to the load being greater than the value yielded by addition of the predetermined margin to the power consumption, the supply unit or the power converter is controlled to decrease the output power until reaching the value yielded by addition of the predetermined margin to the power consumption.

10. The control method of a power generation unit of claim 6, further comprising:

detecting an overload condition in response to the output power being less than the power consumption of the load, and suspending power supply from the power generation unit to the load in response to the overload condition being detected.

11. The control method of a power generation unit of claim 6, wherein the constant prescribed value is set as the increase rate of the output power which is attainable by a fuel cell unit per unit time.

12. The power generation unit of claim 1, wherein the constant prescribed value is set as the increase rate of the output power which is attainable by a fuel cell unit per unit time.

* * * * *